(12) United States Patent
You et al.

(10) Patent No.: US 12,423,937 B2
(45) Date of Patent: Sep. 23, 2025

(54) AUTOMATED DATA PRE-PROCESSING FOR MACHINE LEARNING

(71) Applicant: International Business Machines Corporation, Armonk, NY (US)

(72) Inventors: Yu Zui You, Ningbo (CN); Zhan Peng Huo, Beijing (CN); Jun Zhu, Shanghai (CN); Kuo-Liang Chou, New Taipei (TW); Xuan Feng, Beijing (CN); Jun Hao, Dalian (CN)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 18/166,004

(22) Filed: Feb. 8, 2023

(65) Prior Publication Data

US 2024/0265664 A1    Aug. 8, 2024

(51) Int. Cl.
*G06V 10/20* (2022.01)
*G06V 10/774* (2022.01)

(52) U.S. Cl.
CPC ............ *G06V 10/20* (2022.01); *G06V 10/774* (2022.01)

(58) Field of Classification Search
CPC .............................. G06V 10/20; G06V 10/774
See application file for complete search history.

(56) References Cited

U.S. PATENT DOCUMENTS 8,249,361 B1 * 8/2012 Steffens ............... G06V 10/774
382/209

10,515,155 B2 * 12/2019 Bachrach ............... G06F 40/30
10,972,509 B2   4/2021 Barday et al.
11,461,599 B2 * 10/2022 Ordonez .................. G06T 7/60
(Continued)

FOREIGN PATENT DOCUMENTS

| CN | 103678682 A | 3/2014 |
|----|-------------|--------|
| CN | 114139490 A | 3/2022 |
| TW | I238950 B   | 9/2005 |

OTHER PUBLICATIONS

"AutoAI Overview (Watson Machine Learning)", https://www.ibm.com/docs/en/cloud-paks/cp-data/4.0?topic=models-autoai#autoai-data-use, (Retrieved: Feb. 3, 2023), 6 pages.

(Continued)

*Primary Examiner* — Manav Seth
(74) *Attorney, Agent, or Firm* — CANTOR COLBURN LLP; Jordan Schiller (57) ABSTRACT

Computer-implemented methods for performing automated pre-processing of data for a machine-learning based prediction system are provided. Aspects include receiving a plurality of raw data sets, receiving a plurality of processed data sets, wherein each of the plurality of processed data sets corresponds to one of the plurality of raw data sets, and generating a plurality of pre-processing templates based on the plurality of raw data sets and the processed data set. Aspects also include receiving an input data set, generating, for each of the plurality of pre-processing templates, a matching score for the input data set, and selecting one of the plurality of pre-processing templates based on the matching score. Aspects further include pre-processing the input data set using the selected pre-processing template and providing the pre-processed input data set to the machine learning based prediction system.

20 Claims, 8 Drawing Sheets

(56) References Cited

U.S. PATENT DOCUMENTS

2021/0055011 A1\* 2/2021 Smith ...................... F24F 11/64
2024/0037915 A1\* 2/2024 Ajgaonkar ................ G06T 5/00

OTHER PUBLICATIONS

"Automated Data Preparation", https://www.ibm.com/docs/en/spss-statistics/27.0.0?topic=preparation-automated-data, (Retrieved: Feb. 3, 2023), 2 pages.
"IBM SPSS Modeler", www.ibm.com/products/spss-modeler/details, (Retrieved: Feb. 3, 2023), 9 pages.
Bilalli, et al, "Automated Data Pre-processing via Meta-learning", Universitat Politecnica de Catalunya, Barcelona, Spain, 14 pages.
Bilalli, et al, "Intelligent Assistance for Data Pre-processing", Universitat Politecnica de Catalunya, Barcelona, Spain, 2018, 14 pages.
Madyembwa, et al, "An Automated Data Pre-processing Technique for Machine Learning in Critical Systems", International Journal of Electronic Engineering and Computer Science, 2020, 10 pages.
Minieri, "Automating data preparation and preprocessing in production-ready ML models", https://www.clearbox.ai/blog/2021-02-10-automating-data-preparation-and-preprocessing-in-production-ready-ml-models, (Retrieved: Feb. 3, 2023), 2021, 10 pages.
Paranjape, et al, "Automated Data Preprocessing for Machine Learning Based Analyses", COLLA 2022: The Twelfth International Conference on Advanced Collaborative Networks, Systems and Applications, 2022, 9 pages.

\* cited by examiner

For column "Order ID", the matching score is 87.4%;
For column "Cost", the matching score is 85%;
For column "Name", the matching score is 100%;
For column "Payment Status", the matching score is 100%;

For column "Order ID", the weight is 2;
For column "Cost", the weight is 3;
For column "Name", the weight is 4;
For column "Payment Status", the weight is 1;

So the score calculation should be as the following 606

$$\text{matching score} = \frac{0.874*2 + 0.85*3 + 1*4 + 1*1}{10} = 92.98\%$$

FIG. 6B

AUTOMATED DATA PRE-PROCESSING FOR MACHINE LEARNING

BACKGROUND

The present invention generally relates to pre-processing of data, and more specifically, to computer systems, computer-implemented methods, and computer program products for performing automated pre-processing of datasets for use in machine learning.

The use of machine learning-based prediction systems has drastically increased in recent years. Such systems are often used in a wide variety of industries, such as the medical and financial industries. In general, machine learning-based prediction systems include a trained model that is applied to a set of input data to make a prediction regarding the data set. For example, in the medical industry, a machine learning-based prediction system may receive patient data and make a predicted diagnosis of a medical condition for the patient. In general, data that is input into a machine learning system, both for training and for generating a prediction, must be pre-processed to ensure that the data is in a proper format.

SUMMARY

Embodiments of the present invention are directed to a computer-implemented method performing automated pre-processing of data for a machine-learning based prediction system is provided. According to an aspect, a computer-implemented method includes receiving a plurality of raw data sets, receiving a plurality of processed data sets, wherein each of the plurality of processed data sets corresponds to one of the plurality of raw data sets, and generating a plurality of pre-processing templates based on the plurality of raw data sets and the processed data set. The method also includes receiving an input data set, generating, for each of the plurality of pre-processing templates, a matching score for the input data set, and selecting one of the plurality of pre-processing templates based on the matching score. The method further includes pre-processing the input data set using the selected pre-processing template and providing the pre-processed input data set to the machine learning based prediction system.

According to another non-limiting embodiment of the invention, a system having a memory having computer readable instructions and one or more processors for executing the computer readable instructions, the computer readable instructions controlling the one or more processors to perform operations. The operations include receiving a plurality of raw data sets, receiving a plurality of processed data sets, wherein each of the plurality of processed data sets corresponds to one of the plurality of raw data sets, and generating a plurality of pre-processing templates based on the plurality of raw data sets and the processed data set. The operations also include receiving an input data set, generating, for each of the plurality of pre-processing templates, a matching score for the input data set, and selecting one of the plurality of pre-processing templates based on the matching score. The operations further include pre-processing the input data set using the selected pre-processing template and providing the pre-processed input data set to the machine learning based prediction system.

According to another non-limiting embodiment of the invention, a computer program product for performing automated pre-processing of data for a machine-learning based prediction system is provided. The computer program product includes a computer-readable storage medium having program instructions embodied therewith, the program instructions executable by a processor to cause the processor to perform operations. The operations include receiving a plurality of raw data sets, receiving a plurality of processed data sets, wherein each of the plurality of processed data sets corresponds to one of the plurality of raw data sets, and generating a plurality of pre-processing templates based on the plurality of raw data sets and the processed data set. The operations also include receiving an input data set, generating, for each of the plurality of pre-processing templates, a matching score for the input data set, and selecting one of the plurality of pre-processing templates based on the matching score. The operations further include pre-processing the input data set using the selected pre-processing template and providing the pre-processed input data set to the machine learning based prediction system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

As discussed above, data that is input into a machine learning system, both for training and for generating a prediction, must be pre-processed to ensure that the data is in a proper format. In general, pre-processing the data includes performing related feature engineering on the data, which helps to obtain the feature set of the data, thus further improving the accuracy and rationality of the model. Such pre-processing tasks can include labeling data types and attributes, creating weights for data attributes, and data cleaning tasks (formatting, checking outliers, interpolation, rebalancing, etc.). When an AI model, such as a machine-learning based prediction system, is trained, the data used to train the model has been pre-processed using a specific pre-processing method or set of data processing rules. In order to achieve the best result from a data set provided to the AI model, the data set should be pre-processed using the same pre-processing method. In addition, as user inputs to the model are changed over time, the existing pre-processing methods will not be able to automatically cover it without manually adding new data processing methods or updating the existing pre-processing methods. In exemplary embodiments, a system for performing automated pre-processing of data for a machine-learning based systems is provided.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
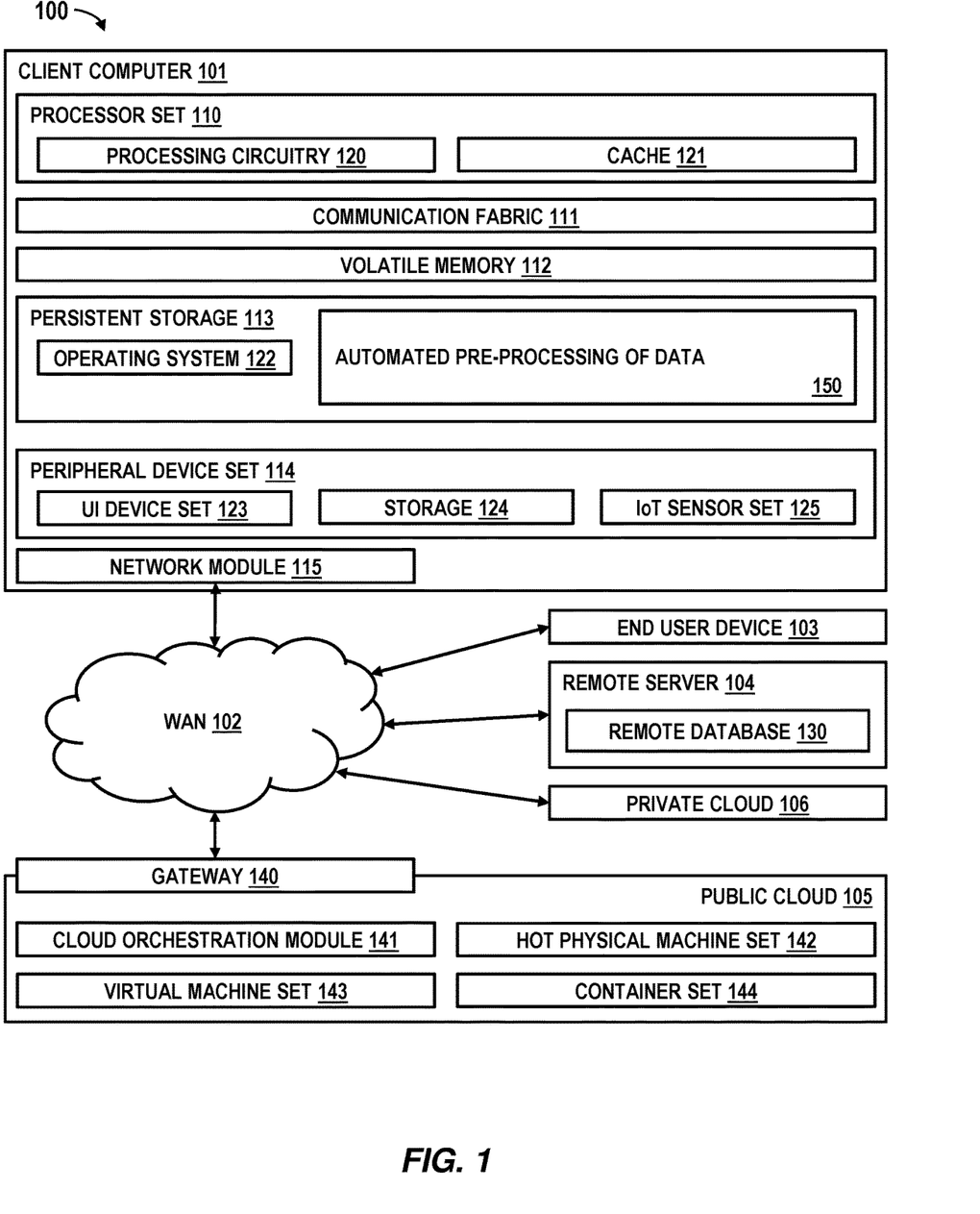
FIG. 1 depicts a block diagram of an example computer system for use in conjunction with one or more embodiments of the present invention.

Computing environment 100 contains an example of an environment for the execution of at least some of the computer code involved in performing the inventive methods, such as automated pre-processing of data 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks. More specifically, one or more embodiments described herein can incorporate and utilize rule-based decision making and artificial intelligence (AI) reasoning to accomplish the various operations described herein, namely containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
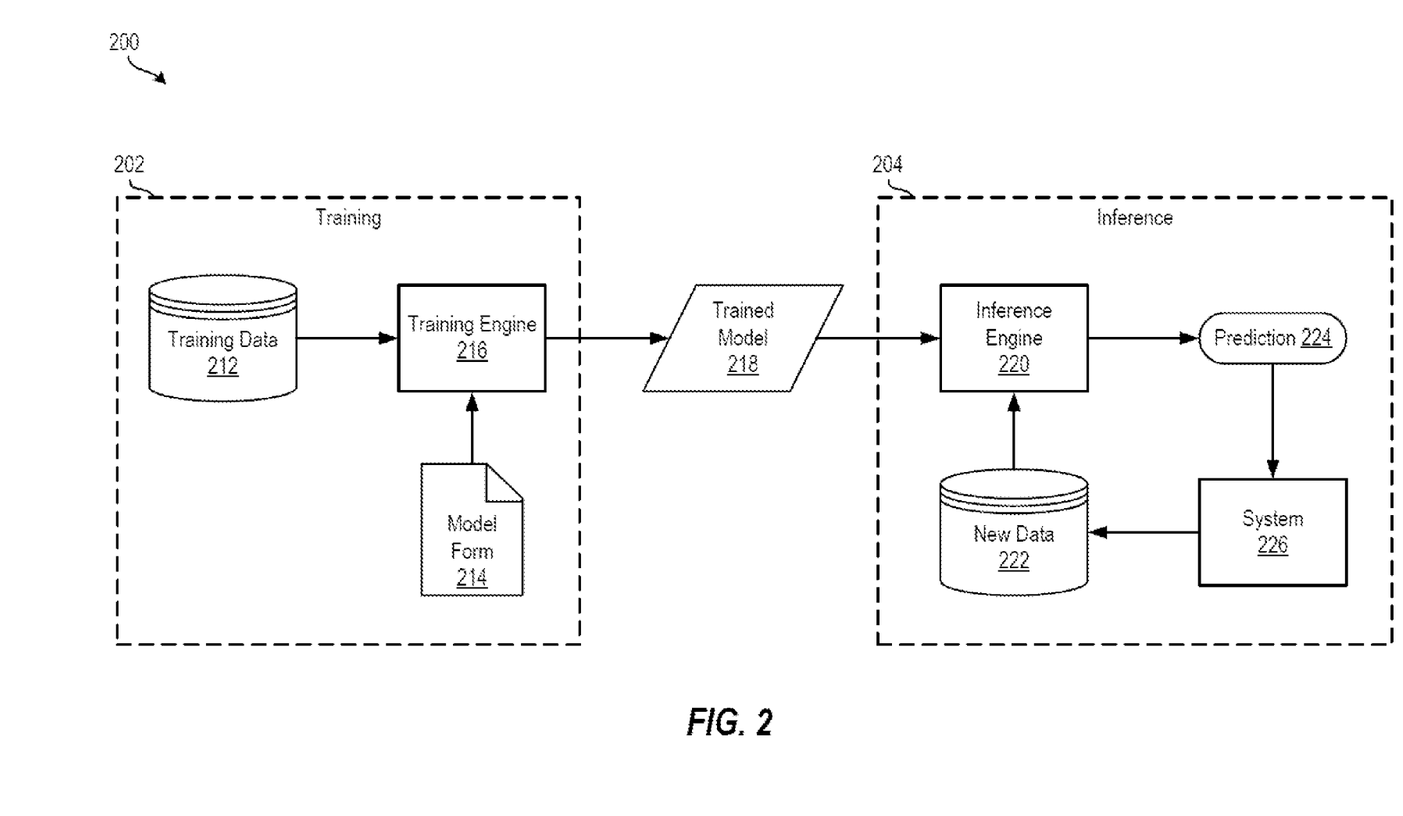
FIG. 2 depicts a block diagram of components of a machine learning training and inference system in accordance with one or more embodiments of the present invention.

Systems for training and using a machine learning model are now described in more detail with reference to FIG. 2. Particularly, FIG. 2 depicts a block diagram of components of a machine learning training and inference system 200 according to one or more embodiments described herein. The system 200 performs training 202 and inference 204. During training 202, a training engine 216 trains a model (e.g., the trained model 218) to perform a prediction and or classification tasks, such as to generating a predicted medical diagnosis or predicting an approval decision on a loan or credit application. Inference 204 is the process of implementing the trained model 218 to perform the task, such as to generate a predicted medical diagnosis or predict an approval decision on a loan or credit application, in the context of a larger system (e.g., a system 226). All or a portion of the system 200 shown in FIG. 2 can be implemented, for example by all or a subset of the computing environment 100 of FIG. 1.

The training 202 begins with training data 212, which may be structured or unstructured data. According to one or more embodiments described herein, the training data 212 includes a corpus of medical data and associated diagnoses and/or a corpus of financial user data associated load/credit application decisions. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 may be a model form of a CNN. The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 may be performed multiple times (referred to as "epochs") until a suitable model is trained (e.g., the trained model 218).

Once trained, the trained model 218 can be used to perform inference 204 to perform prediction and or classification tasks. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

Figure 3:
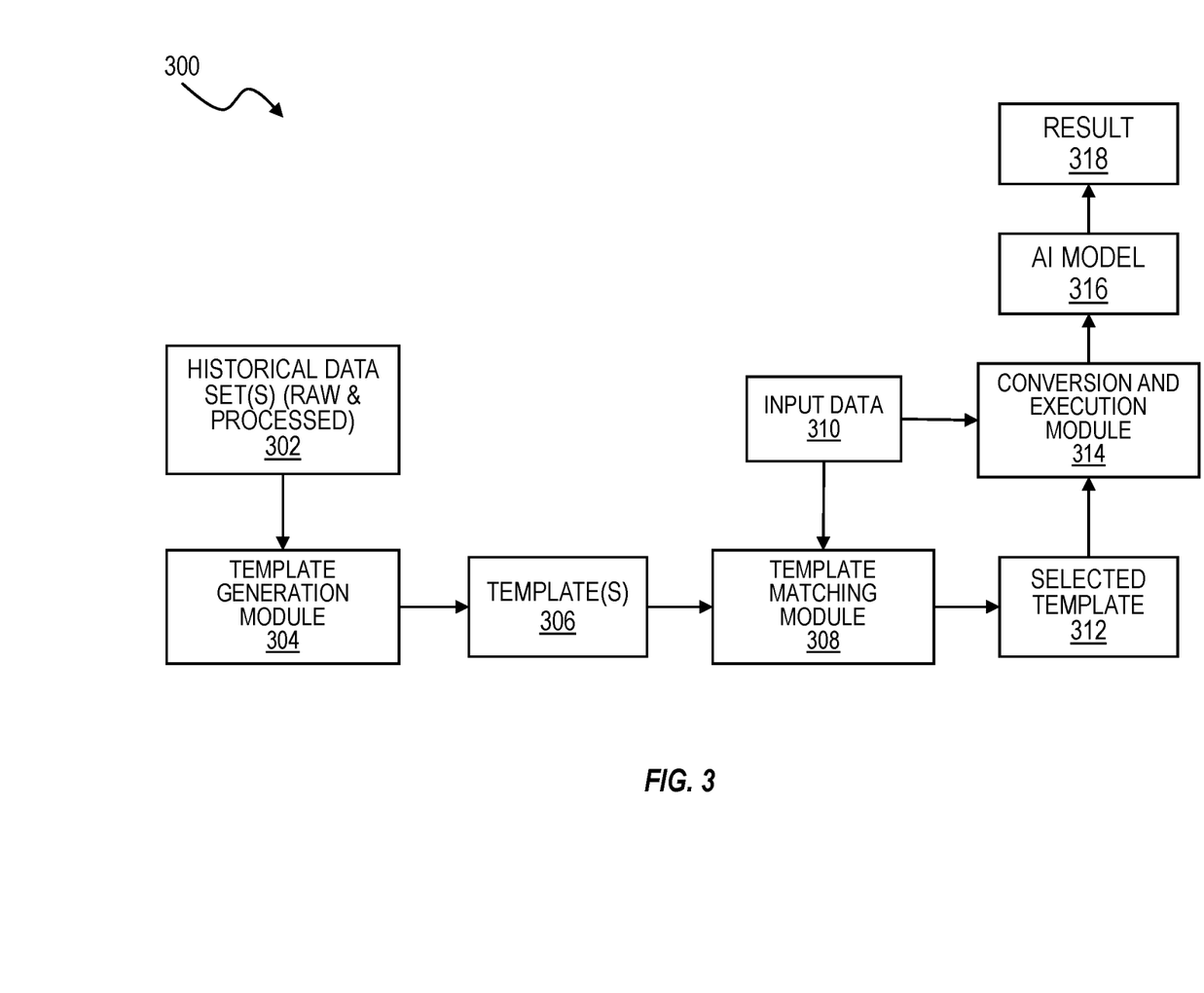
FIG. 3 is a block diagram of a system for performing automated pre-processing of data for a machine-learning based prediction system in accordance with one or more embodiments of the present invention.

Referring now to FIG. 3, a system 300 for performing automated pre-processing of data for a machine-learning based prediction system in accordance with one or more embodiments of the present invention is shown. As illustrated, the system 300 includes a template generation module 304, a template matching module 308, a conversion and execution module 314, and an AI model 316. All or a portion of the template generation module 304, a template matching module 308, a conversion and execution module 314, and an AI model 316 shown in FIG. 3 can be implemented, for example by all or a subset of the computing environment 100 of FIG. 1.

In exemplary embodiments, the template generation module 304 is configured to receive historical data sets 302. In exemplary embodiments, the historical data sets 302 includes at least one raw input data set and a pre-processed version of the raw data set. In exemplary embodiments, each of the plurality of raw data sets includes a plurality of columns of data that each have an attribute, or label, that corresponds to each column. For example, the column of data includes a header that may be considered an attribute for the column. In addition, each of the processed data sets includes a plurality of columns of data and at least one of the plurality of columns of data includes a user-assigned attribute that was added during pre-processing of the data. Furthermore, in some embodiments, each column of data in the processed data sets may include a weight, or importance level, that is assigned by a user during pre-processing of the data. The template generation module 304 is configured to create a set of templates 306 based on the historical data sets 302. In one embodiment, each template 306 is created based on a comparison of a pre-processed data set and its corresponding raw data set.

The template matching module 308 is configured to receive an input data set 310 and the set of templates 306. In exemplary embodiments, the input data set 310 is a raw data set that is being provided to obtain a prediction for the machine-learning based prediction system. The template matching module 308 is further configured to generate a matching score between the input data set 310 and each template 306. In one embodiment, generating the matching score for a template includes identifying an attribute for each column of the input data set, identifying a corresponding column of the template based on the attribute, generating a column matching score for each column of the input data set to the corresponding column, and creating the matching score by combining the column matching score for each column of the input data set. In one embodiment, combining the column matching score for each column of the input data set includes calculating a weighted combination of the column matching scores to generate the matching score for the template. In one embodiment, each column of the template is assigned a weight that corresponds to the attribute type of the column. These weights may be obtained based on the pre-processed data set that was used to create the template. For example, a data scientist may assign a weight, or importance level, to each column of data during pre-processing of the data. In one embodiment, the weight is positively correlated with the importance of the column of data and a primary key of the data set may be assigned a highest weight.

Once a matching score has been determined for each template, by the template generation module 308, the template generation module 308 outputs a selected template 312. In exemplary embodiments, the selected template 312 is the template with the highest matching score. The conversion and execution module 314 receives both the input data set 310 and the selected template 312. The conversion and execution module 314 is configured to pre-process the input data set 310 according to the selected template 312. Once the conversion and execution module 314 has completed pre-processing of the input data set 310, the conversion and execution module 314 provides the pre-processed data to the AI model 316 for execution. The AI model 316 responsively outputs result 318.

Figure 4:
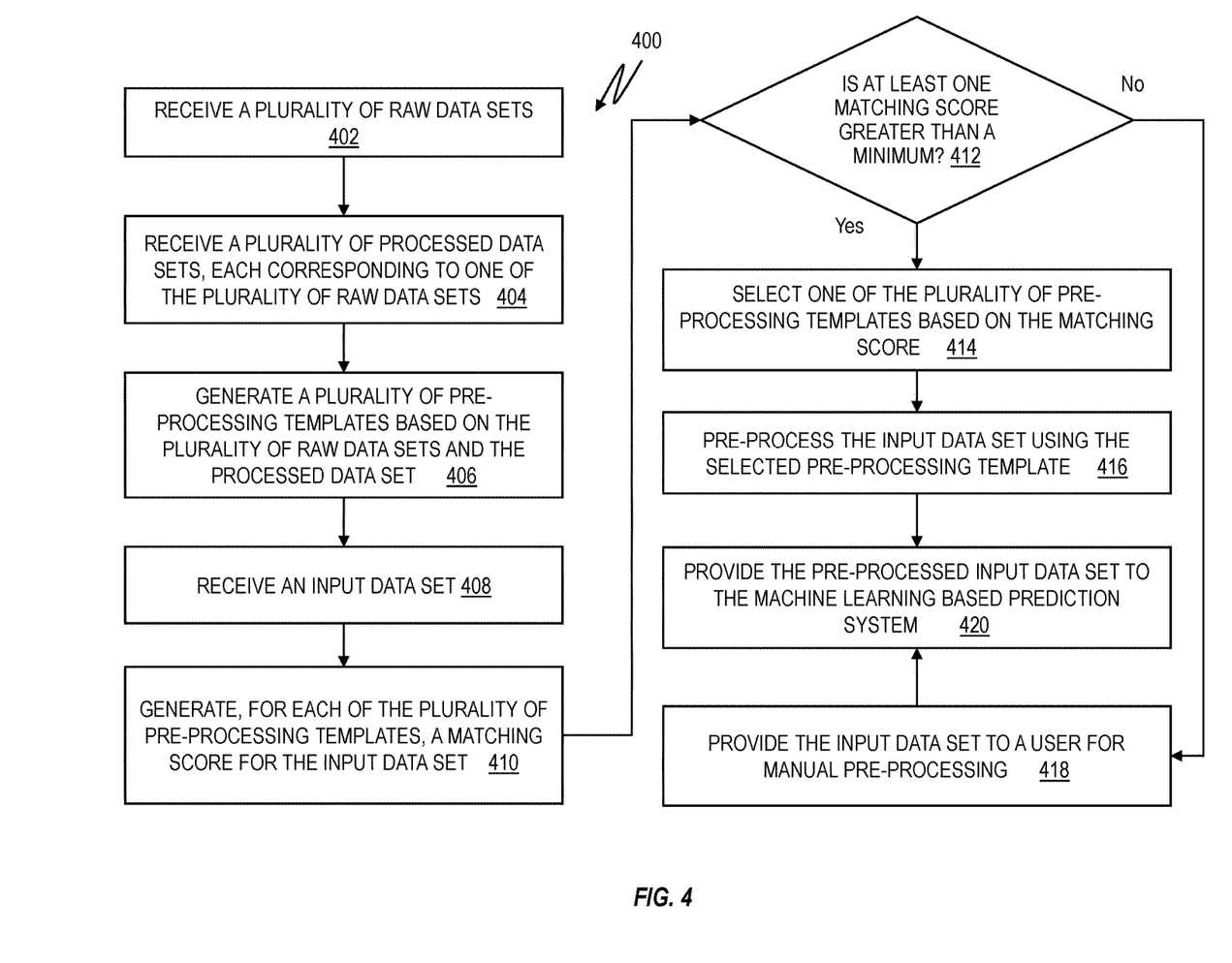
FIG. 4 is a flowchart of a method for performing automated pre-processing of data for a machine-learning based prediction system in accordance with one or more embodiments of the present invention.

Referring now to FIG. 4, a flowchart of a method 400 for performing automated pre-processing of data for a machine-learning based prediction system in accordance with one or more embodiments of the present invention is shown. As shown at block 402, the method 400 includes receiving a plurality of raw data sets. In exemplary embodiments, each of the plurality of raw data sets includes a plurality of columns of data and each of the plurality of columns of data includes one or more attributes. For example, the attributes include an intention, column name, content type, and format. Next, at block 404, the method 400 includes receiving a plurality of processed data sets, each of the plurality of processed data sets corresponds to one of the plurality of raw data sets. In one embodiment, the plurality of pre-processing templates includes a user assigned attribute for at least one of the plurality of columns of data. The user assigned attribute is an expression of intention by a user that performed the pre-processing on the data set.

Next, as shown at block 406, the method 400 includes generating a plurality of pre-processing templates based on the plurality of raw data sets and the processed data set. In exemplary embodiments, a template is generated for each of the plurality of processed data sets. In exemplary embodiments, generating the templates includes detecting and extracting attributes, including user assigned attributes, from the processed data sets and comparing the processed data sets to their corresponding raw data sets. In exemplary embodiments, the data processing methods of the data scientists used to create the processed data sets from the raw data sets are learned and transformed into templates by a template generation module.

The method 400 also includes receiving an input data set, as shown at block 408. The input data set is a raw data set that is being provided to a machine-learning based prediction/classification system to obtain a prediction or classification. Next, as shown at block 410, the method 400 includes generating, for each of the plurality of pre-processing templates, a matching score for the input data set. In exemplary embodiments, generating the matching score for one of the plurality of pre-processing templates includes identifying an attribute for each column of the input data set, identifying a corresponding column of the pre-processing template based on the attribute, generating a column matching score for each column of the input data set to the corresponding column, and creating the matching score by combining the column matching score for each column of the input data set. In one embodiment, combining the column matching score for each column of the input data set includes calculating a weighted combination. In one embodiment, each column of the template is assigned a weight that corresponds to the attribute type of the column. These weights may be obtained based on the pre-processed data set that was used to create the template. For example, a data scientist may assign a weight, or importance level, to each column of data during pre-processing of the data. In one embodiment, the weight is positively correlated with the importance of the column of data and a primary key of the data set may be assigned a highest weight.

Once each template has been assigned a matching score, the method 400 proceeds to decision block 412, and it is determined if at least one of the templates has a matching score that is above a threshold minimum. In one embodiment, the threshold minimum is set by a user and may have a value of fifty percent. If at least one of the templates has a matching score that is above the threshold minimum, the method proceeds to block 414 and selects one of the plurality of pre-processing templates based on the matching score. In one embodiment, selecting one of the plurality of pre-processing templates includes selecting the one of the plurality of pre-processing templates having a highest matching score. If none of the templates have a matching score that is above the threshold minimum, the method proceeds to block 418 and the input data set is provided to a user for manual pre-processing. As shown at block 416, the method 400 also includes pre-processing the input data set using the selected pre-processing template. The method 400 concludes at block 420 by providing the pre-processed input data set to the machine learning based prediction system.

Figure 5:
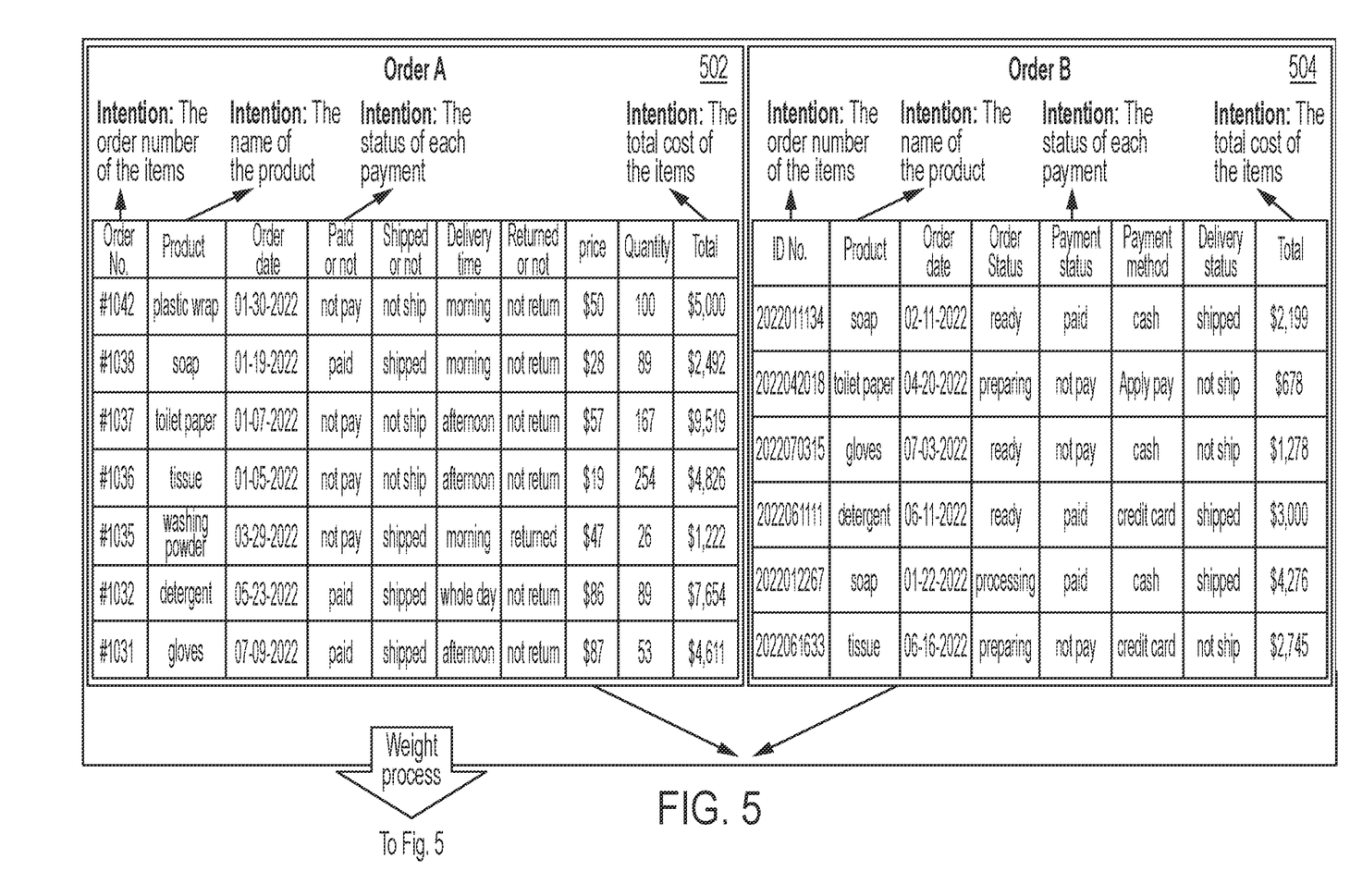
FIG. 5 is a schematic diagram illustrating the operation of a template generation module in accordance with one or more embodiments of the present invention.

Referring now to FIG. 5, a schematic diagram illustrating the operation of a template generation module in accordance with one or more embodiments of the present invention is shown. As illustrated, a templated 508 is created based on one or more raw data sets 502, 504 and based on processed versions of the raw data sets 502, 504 that are received from a user 506, which has processed the raw data sets 502, 504. The template includes a number of attributes for one or more columns of data. One or more of the attributes can be extracted directly from the raw data, i.e., a column header and one or more of the attributes may be provided by the user 506. In one embodiment, each attribute also includes a weight that may be assigned by the user. In exemplary embodiments, the weight of a column is determined based on a frequency of repeated data in the column, i.e., a primary key of the data set may have a highest weight.

Figure 6A:
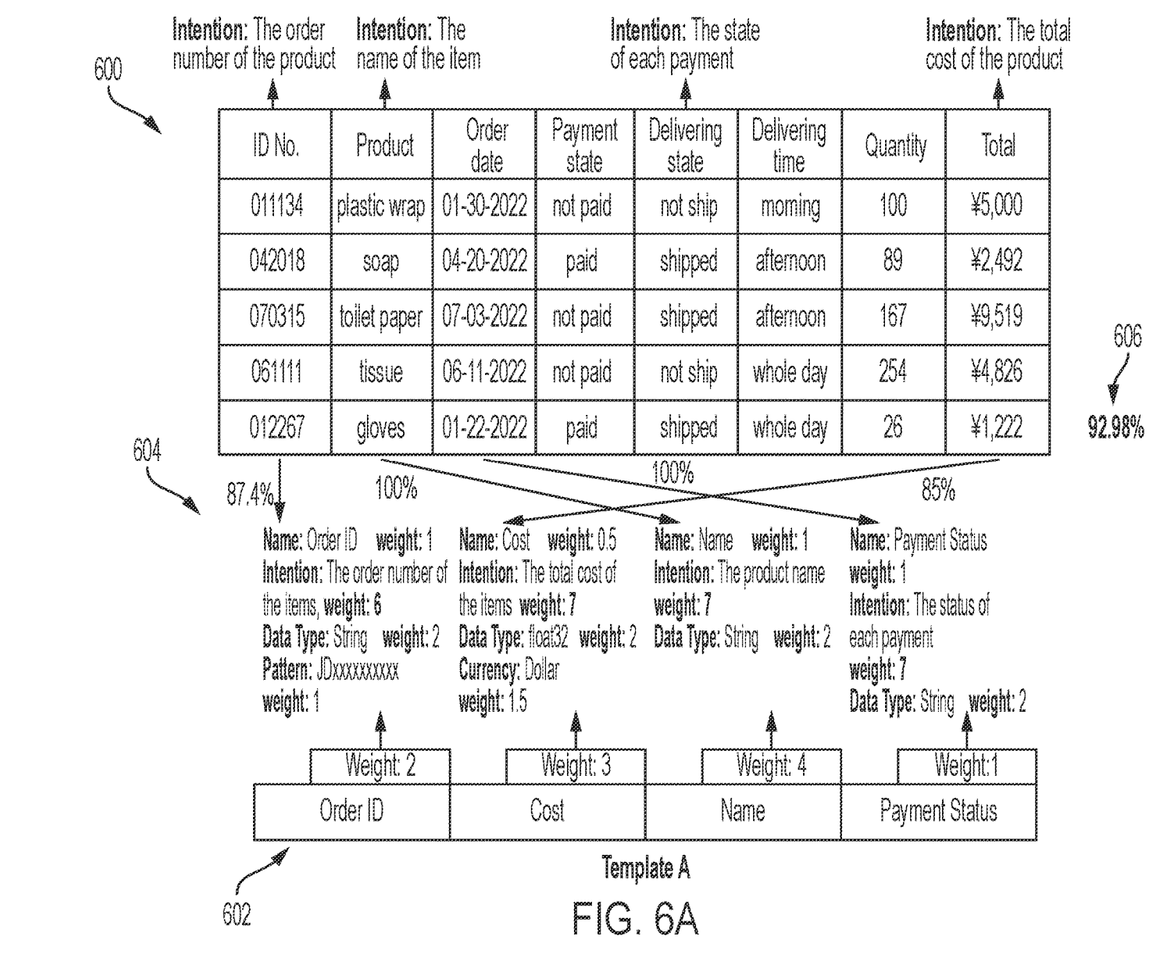
FIGS. 6A and 6B are diagrams illustrating the generation of a matching score for input data set with a template in accordance with one or more embodiments of the present invention.
Figure 6B:
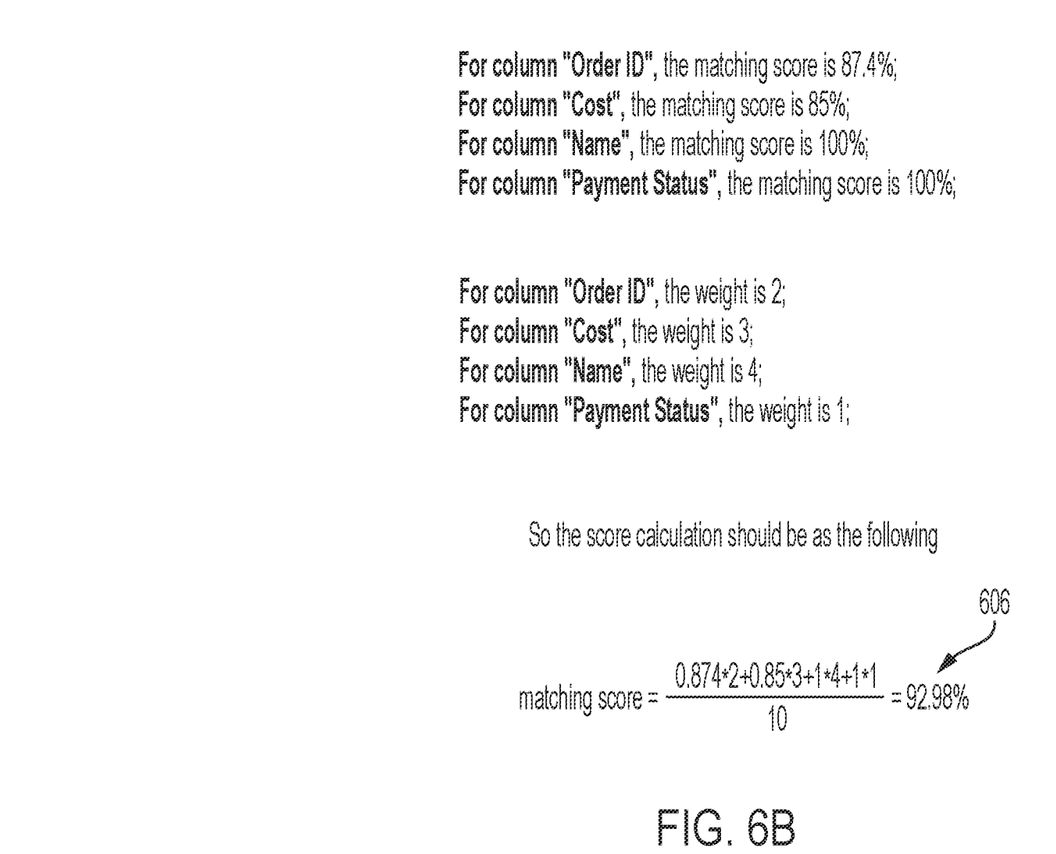

Referring now to FIGS. 6A and 6B diagrams illustrating the generation of a matching score for input data set with a template in accordance with one or more embodiments of the present invention are shown. As illustrated, a matching score 606 for an input data set 600 with a templated 602 is created by analyzing the input data set 600 and the template 602. Analyzing the input data set 600 and the template 602 includes creating column matching scores 604 for each column of the template 602 with corresponding columns in the input data set 600. Once the column matching scores 604 are calculated, the matching score 606 is created based on a weighted combination of the column matching scores 604, as shown in FIG. 6B.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for performing automated pre-processing of data for a machine-learning based prediction system, the method comprising:
    receiving a plurality of raw data sets;
    receiving a plurality of processed data sets, wherein each of the plurality of processed data sets corresponds to one of the plurality of raw data sets;
    generating a plurality of pre-processing templates based on the plurality of raw data sets and the processed data set, wherein generating the plurality of pre-processing templates comprises: detecting and extracting attributes from the plurality of processed data sets;
comparing the plurality of processed data sets to the corresponding plurality of raw data sets;
and learning data processing methods used by data scientists;
    receiving an input data set;
    generating, for each of the plurality of pre-processing templates, a matching score for the input data set, wherein the matching score is calculated by executing a computer-implemented matching algorithm that, for each column in the input data set:
        automatically extracting and comparing the column attribute and header to corresponding columns in the pre-processing template using a similarity metric;
        applying user-assigned weights associated with each template column to the similarity results to generate a weighted column score; and
        combining the weighted column scores for all columns in the input data set using a predetermined aggregation function to produce the matching score for the template;
    selecting one of the plurality of pre-processing templates based on the matching score;
    pre-processing the input data set using the selected pre-processing template; and
    providing the pre-processed input data set to the machine learning based prediction system.

2. The method of claim 1, wherein each of the plurality of raw data sets includes a plurality of columns of data and wherein generating the plurality of pre-processing templates includes detecting an attribute for each of the plurality of columns of data.

3. The method of claim 1, wherein each of the plurality of processed data sets includes a plurality of columns of data and wherein generating the plurality of pre-processing templates includes detecting a user assigned attribute for at least one of the plurality of columns of data.

4. The method of claim 1, wherein generating the matching score for one of the plurality of pre-processing templates comprises:
    identifying an attribute for each column of the input data set;
    identifying a corresponding column of the pre-processing template based on the attribute;
    generate a column matching score for each column of the input data set to the corresponding column, wherein the column matching score is based on analyzing column attributes and headers; and
    creating the matching score by combining the column matching score for each column of the input data set.

5. The method of claim 4, wherein combining the column matching score for each column of the input data set includes calculating a weighted combination.

6. The method of claim 5, wherein each column of the pre-processing template is assigned a weight that corresponds to the attribute type of the column.

7. The method of claim 1, wherein selecting one of the plurality of pre-processing templates includes selecting the one of the plurality of pre-processing templates having a highest matching score.

8. The method of claim 1, further comprising providing the input data set to a user for manual pre-processing based on a determination that none of the matching scores are above a threshold minimum score.

9. A computing system having a memory having computer readable instructions and one or more processors for executing the computer readable instructions, the computer readable instructions controlling the one or more processors to perform operations comprising:
receiving a plurality of raw data sets;
receiving a plurality of processed data sets, wherein each of the plurality of processed data sets corresponds to one of the plurality of raw data sets;
generating a plurality of pre-processing templates based on the plurality of raw data sets and the processed data set, wherein generating the plurality of pre-processing templates comprises: detecting and extracting attributes from the plurality of processed data sets;
comparing the plurality of processed data sets to the corresponding plurality of raw data sets;
and learning data processing methods used by data scientists;
receiving an input data set;
generating, for each of the plurality of pre-processing templates, a matching score for the input data set,
wherein the matching score is calculated by executing a computer-implemented matching algorithm that, for each column in the input data set:
automatically extracting and comparing the column attribute and header to corresponding columns in the pre-processing template using a similarity metric;
applying user-assigned weights associated with each template column to the similarity results to generate a weighted column score; and
combining the weighted column scores for all columns in the input data set using a predetermined aggregation function to produce the matching score for the template;
selecting one of the plurality of pre-processing templates based on the matching score;
pre-processing the input data set using the selected pre-processing template; and
providing the pre-processed input data set to the machine learning based prediction system.

10. The computing system of claim 9, wherein each of the plurality of raw data sets includes a plurality of columns of data and wherein generating the plurality of pre-processing templates includes detecting an attribute for each of the plurality of columns of data.

11. The computing system of claim 9, wherein each of the plurality of processed data sets includes a plurality of columns of data and wherein generating the plurality of pre-processing templates includes detecting a user assigned attribute for at least one of the plurality of columns of data.

12. The computing system of claim 9, wherein generating the matching score for one of the plurality of pre-processing templates comprises:
identifying an attribute for each column of the input data set;
identifying a corresponding column of the pre-processing template based on the attribute;
generate a column matching score for each column of the input data set to the corresponding column, wherein the column matching score is based on analyzing column attributes and headers; and
creating the matching score by combining the column matching score for each column of the input data set.

13. The computing system of claim 12, wherein combining the column matching score for each column of the input data set includes calculating a weighted combination.

14. The computing system of claim 13, wherein each column of the pre-processing template is assigned a weight that corresponds to the attribute type of the column.

15. The computing system of claim 9, wherein selecting one of the plurality of pre-processing templates includes selecting the one of the plurality of pre-processing templates having a highest matching score.

16. The computing system of claim 9, wherein the operations further comprise providing the input data set to a user for manual pre-processing based on a determination that none of the matching scores are above a threshold minimum score.

17. A computer program product comprising a computer readable storage medium having program instructions embodied therewith, the program instructions executable by a processor to cause the processor to perform operations comprising:
receiving a plurality of raw data sets;
receiving a plurality of processed data sets, wherein each of the plurality of processed data sets corresponds to one of the plurality of raw data sets;
generating a plurality of pre-processing templates based on the plurality of raw data sets and the processed data set, wherein generating the plurality of pre-processing templates comprises: detecting and extracting attributes from the plurality of processed data sets;
comparing the plurality of processed data sets to the corresponding plurality of raw data sets;
and learning data processing methods used by data scientists;
receiving an input data set;
generating, for each of the plurality of pre-processing templates, a matching score for the input data set,
wherein the matching score is calculated by executing a computer-implemented matching algorithm that, for each column in the input data set:
automatically extracting and comparing the column attribute and header to corresponding columns in the pre-processing template using a similarity metric;
applying user-assigned weights associated with each template column to the similarity results to generate a weighted column score; and
combining the weighted column scores for all columns in the input data set using a predetermined aggregation function to produce the matching score for the template;
selecting one of the plurality of pre-processing templates based on the matching score;
pre-processing the input data set using the selected pre-processing template; and
providing the pre-processed input data set to the machine learning based prediction system.

18. The computer program product of claim 17, wherein each of the plurality of raw data sets includes a plurality of columns of data and wherein generating the plurality of pre-processing templates includes detecting an attribute for each of the plurality of columns of data.

19. The computer program product of claim 17, wherein each of the plurality of processed data sets includes a plurality of columns of data and wherein generating the plurality of pre-processing templates includes detecting a user assigned attribute for at least one of the plurality of columns of data.

20. The computer program product of claim 17, wherein generating the matching score for one of the plurality of pre-processing templates comprises:
- identifying an attribute for each column of the input data set;
- identifying a corresponding column of the pre-processing template based on the attribute;
- generate a column matching score for each column of the input data set to the corresponding column, wherein the column matching score is based on analyzing column attributes and headers; and
- creating the matching score by combining the column matching score for each column of the input data set.

* * * * *